(12) United States Patent
Burns et al.

(10) Patent No.: US 6,931,559 B2
(45) Date of Patent: Aug. 16, 2005

(54) MULTIPLE MODE POWER THROTTLE MECHANISM

(75) Inventors: James S. Burns, Los Altos, CA (US); Stefan Rusu, Sunnyvale, CA (US); David J. Ayers, Fremont, CA (US); Edward T. Grochowski, San Jose, CA (US); Marsha Eng, Sunnyvale, CA (US); Vivek Tiwari, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 10/041,013

(22) Filed: Dec. 28, 2001

(65) Prior Publication Data

US 2003/0126478 A1 Jul. 3, 2003

(51) Int. Cl.[7] .................................................. G06F 1/32
(52) U.S. Cl. ...................... 713/340; 713/320; 713/321; 710/15; 710/18
(58) Field of Search ................................. 713/300, 320, 713/321, 340; 710/15, 18

(56) References Cited

U.S. PATENT DOCUMENTS

| | | |
|---|---|---|
| 4,300,048 A | 11/1981 | Barbier et al. |
| 4,551,031 A | 11/1985 | Ishikawa et al. |
| 5,021,679 A | 6/1991 | Fairbanks et al. |
| 5,046,858 A | 9/1991 | Tucker |
| 5,153,535 A | 10/1992 | Fairbanks et al. |
| 5,287,292 A | 2/1994 | Kenny et al. |
| 5,307,003 A | 4/1994 | Fairbanks et al. |
| 5,373,254 A | 12/1994 | Nakauchi et al. |
| 5,392,437 A | 2/1995 | Matter et al. |
| 5,495,617 A | 2/1996 | Yamada |
| 5,557,551 A | 9/1996 | Craft |
| 5,627,412 A | 5/1997 | Beard |
| 5,719,800 A | * 2/1998 | Mittal et al. ................ 713/321 |

(Continued)

FOREIGN PATENT DOCUMENTS

| | | |
|---|---|---|
| EP | 0549165 A2 | 6/1993 |
| WO | WO 9917186 A1 | 4/1999 |

OTHER PUBLICATIONS

U.S. Appl. No. 10/206,610, filed Jul. 26, 2002, "A VCC Adaptive Dynamically Variable Frequency Clock System for High Performance, Low Power Microprocessors," 48 pages including Figures.

U.S. Appl. No. 09/471,795, filed Dec. 23, 1999, "Microprocessor with Digital Power Throttle," 31 pages including Figures.

U.S. Appl. No. 10/041,092, filed Dec. 28, 2001, "Digital Throttle for Multiple Operating Points," 30 pages including Figures.

U.S. Appl. No. 10/227,125, filed Aug. 23, 2002, "An Apparatus for Thermal Management of Multiple Core Microprocessors," 21 pages including Figures.

U.S. Appl. No. 10/044,865, filed Oct. 22, 2001, "An Adaptive Variable Frequency Clock System for High Performance Low Power Microprocessors," 35 pages including Figures.

*Primary Examiner*—Rehana Perveen
(74) *Attorney, Agent, or Firm*—Tom R. Lane

(57) ABSTRACT

A processor includes a digital throttle to monitor the activity of various units of the processor's instruction execution pipeline, and to determine a power state for the processor from the monitored activity. One of two or more power control mechanisms is engaged, responsive to the power state of the processor reaching a threshold.

19 Claims, 9 Drawing Sheets

U.S. PATENT DOCUMENTS

| | | |
|---|---|---|
| 5,752,011 A | 5/1998 | Thomas et al. |
| 5,766,228 A | 6/1998 | Bonnet et al. |
| 5,781,783 A | 7/1998 | Gunther et al. |
| 5,815,724 A | 9/1998 | Mates |
| 5,822,369 A | 10/1998 | Araki |
| 5,832,284 A | 11/1998 | Michail et al. |
| 5,835,885 A | 11/1998 | Lin |
| 5,838,578 A | 11/1998 | Pippin |
| 5,902,044 A | 5/1999 | Pricer et al. |
| 5,964,881 A | 10/1999 | Thor |
| 5,966,931 A * | 10/1999 | Yoshizaki et al. ............ 60/284 |
| 5,974,557 A | 10/1999 | Thomas et al. |
| 6,029,006 A | 2/2000 | Alexander et al. |
| 6,038,515 A * | 3/2000 | Kikuchi et al. ............... 702/63 |
| 6,069,798 A * | 5/2000 | Liu ............................. 363/16 |
| 6,078,356 A | 6/2000 | Jensen |
| 6,091,255 A | 7/2000 | Godfrey |
| 6,172,611 B1 | 1/2001 | Hussain et al. |
| 6,192,479 B1 | 2/2001 | Ko |
| 6,211,740 B1 | 4/2001 | Dai et al. |
| 6,216,235 B1 | 4/2001 | Thomas et al. |
| 6,219,796 B1 | 4/2001 | Bartley |
| 6,393,374 B1 | 5/2002 | Rankin et al. |
| 6,407,595 B1 | 6/2002 | Huang et al. |
| 6,487,668 B2 | 11/2002 | Thomas et al. |
| 6,559,631 B1 | 5/2003 | Balch et al. |
| 2001/0021217 A1 | 9/2001 | Gunther et al. |
| 2002/0143488 A1 | 10/2002 | Cooper et al. |

* cited by examiner

MULTIPLE MODE POWER THROTTLE MECHANISM

RELATED PATENT APPLICATIONS

This patent application is related to U.S. patent application Ser. No. 10/041,092, "Digital Throttle for Multiple Operating Points", filed on even date herewith and assigned to the same assignee.

BACKGROUND OF THE INVENTION

1. Technical Field

The present invention relates to microprocessors and, in particular, to mechanisms for controlling power consumption in microprocessors.

2. Background Art

Modern processors include extensive execution resources to support concurrent processing of multiple instructions. A processor typically includes one or more integer, floating point, branch, and memory execution units to implement integer, floating point, branch, and load/store instructions, respectively. Register files and on-chip caches are also provided to supply the execution resources with operands. When fully engaged by an executing program, these resources can create significant power dissipation problems.

Instruction code sequences that include enough instructions of the correct type to fully engage a processor's execution resources for significant intervals are relatively rare. Smart compilers and out of order execution can only extract so much instruction level parallelism (ILP) from most code. To conserve power, a processor may employ a clock gating mechanism to cut off the clock signal delivered to execution resources or their components that are not used by an executing code sequence. Such a processor can engage extensive resources as needed, e.g., to support code sequences with high ILP, without dissipating large amounts of power when code sequences with more typical ILP levels execute.

For code sequences having high ILP, few if any resources can be gated off, and the processor can dissipate significantly greater power than it does running code characterized by more typical ILP. To accommodate power-hungry code, a processor may be run at less than its top performance level by, for example, limiting its operating frequency. Hobbling the processor in this manner leaves a thermal margin for those code sequences that cause the processor to dissipate large amounts of power.

An alternative strategy, called power throttling, allows the processor to operate at its top performance level by default and reduces (throttles) the performance level if the processor's power consumption becomes too great. Power throttling may be implemented through a number of mechanisms. These include altering the number of instructions processed per clock cycle (instruction throughput) or altering the voltage and/or the frequency at which the processor operates (operating point). These and other power control mechanisms have their particular advantages and disadvantages.

Power dissipation scales quadratically with processor voltage, making adjustment to voltage levels a potent tool for controlling processor power. Power dissipation scales linearly with the processor's clock frequency. However, frequency and voltage are typically adjusted together, because the maximum frequency is limited by the voltage drive available at transistor gates. Further, the latency for operating point adjustments is significantly greater than the time scale on which a processor's power consumption can change, making it a relatively course mechanism for managing these changes. Power dissipation scales linearly with instruction throughput. Adjustments to instruction throughput may be implemented with lower latency than operating point changes, but they may not be sufficient to offset a change in power consumption.

The present invention addresses these and other problems associated with monitoring and controlling power consumption by processor and other programmable devices.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a mechanism for controlling the power dissipation of a processor using multiple power control modes. A computer system includes a processor having a digital throttle. The digital throttle monitors the activity of the processor to estimate the processor's power state. The digital throttle triggers one of the multiple power control modes, if warranted by the estimated power state. For one embodiment of the invention, a first power mode is triggered, if the estimated power state reaches a first threshold. A second power control mode may be triggered, depending on the response of the processor to the first power control mode.

The various power control modes may be engaged according to the latencies with which they control power dissipation. For example, instruction throughput control mechanisms, such as no-operation injection and single instruction issue, effectively adjust the number of instructions processed per clock cycle. These mechanisms may be implemented within several clock cycles of detecting a power state problem. They can be used to make small adjustments to power state, and their relatively short latency allows them to address problems associated with rapid current changes, e.g. voltage droop associated with large di/dt.

Frequency control mechanisms, e.g. reducing clock frequency if power dissipation exceeds a threshold, may have greater impact on power dissipation. Frequency control takes more time to implement than throughput control, since the phase locked loops that drive clocks need to be readjusted. Combined voltage and frequency mechanisms have still greater impact on power dissipation, but have the longest implementation latencies. The present invention allows one or more power control mechanisms to be engaged, depending on the power state of the processor.

Figure 1:
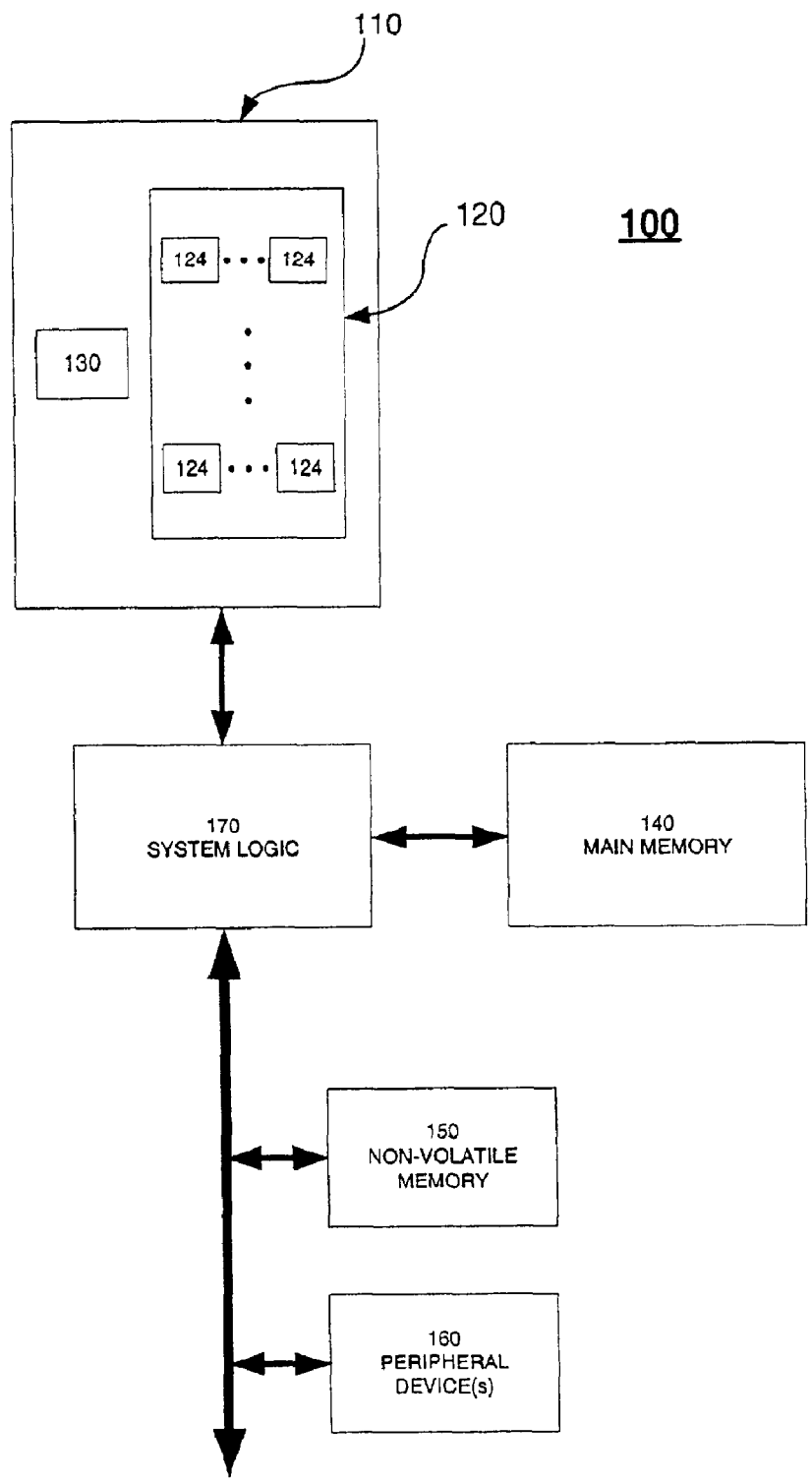
FIG. 1 is a block diagram of one embodiment of a computer system on which the present invention may be implemented.

FIG. 1 is a block diagram of one embodiment of a computer system 100 in which the present invention may be implemented. Computer system 100 includes one or more processors 110, a main memory 140, a non-volatile memory 150, various peripheral devices 160, and system logic 170. System logic 170 controls data transfers among processor(s) 110, main memory 140, non-volatile memory 150, and peripheral devices 160. A power delivery unit 180 is also shown. Computer system 100 is provided to illustrate various features of the present invention. The particular configuration shown is not necessary to implement the present invention.

Processor 110 includes multiple units 124, which form an instruction execution pipeline 120. Instructions are provided to processor 110 from main memory 140 and non-volatile memory 150. A digital throttle 130 monitors power consumption in the various units 124 in response to the processed instructions and adjusts operation of processor 110 accordingly.

As an instruction is staged down pipeline 120, it directs various units 124 to perform one or more operations that, taken together, implement the instruction. For example, a floating-point multiply-accumulate instruction (FMAC) may cause the following operations to occur in the indicated resources: a floating point register file reads out three operands; an FMAC execution unit multiplies two of the operands and adds the product to the third operation; an exception unit checks the product and sum for errors; and a retirement unit writes the result to the floating point register file if no errors are detected. Depending on the particular processor implementation, these resources or their components may be grouped into one or more units which are turned on and off as the instruction is staged down the pipeline. Each unit consumes a certain amount of current as it is activated by the instruction.

For one embodiment of the present invention, the current or power consumed by a unit 124 is represented by an associated weight or weights. When a unit is activated by an instruction, digital throttle 130 detects its active state and includes a first weight in a sum representing the activity, e.g. current or power consumption, of the processor on a given clock cycle. If the unit is not activated, digital throttle 130 may add a second weight to the sum. The second weight may be zero or a value representing current or power consumption of the unit in the inactive state. For one embodiment, the resulting weighted sum is scaled to reflect the processor's current operating point. For another embodiment, the individual weights may themselves be scaled. Digital throttle 130 implements these operations over a selected interval, generates a value representing an estimated power state for the processor, and adjusts the processor's operation if the value exceeds a specified threshold level.

Figure 2:
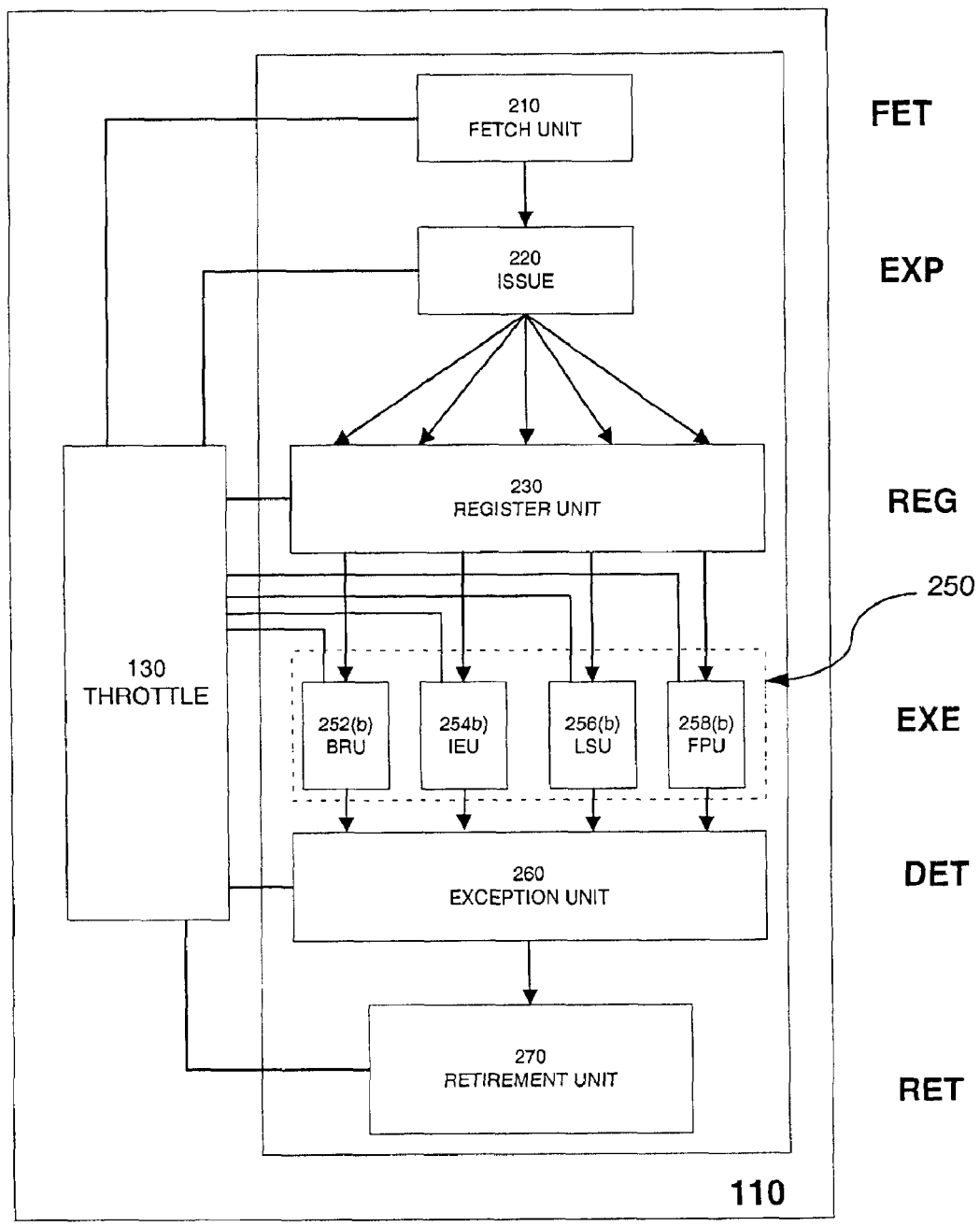
FIG. 2 is a block diagram of one embodiment of a processor that implements a digital power throttle in accordance with the present invention.

FIG. 2 represents in greater detail one embodiment of processor 110. For the disclosed embodiment of processor 110, pipeline 120 is represented as fetch (FET), expand (EXP), register (REG), execution (EXE), detect (DET), and retirement (RET) stages, respectively, and the execution resources corresponding to each stage are indicated. The present invention does not require partition of processor 110 into a particular set of pipeline stages. For example, a disclosed stage may be subdivided into two or more stages to address timing issues or facilitate higher processor clock speeds. Alternatively, two or more stages may be combined into a single stage. Other embodiments may include hardware for processing instructions out-of-order. The disclosed pipeline provides only one example of how operations may be partitioned in a processor implementing the present invention.

The front end of pipeline 120 includes fetch unit 210 and issue unit 220, which provide instructions to execution units in the back end of pipeline 120 for execution. Fetch unit 210 retrieves instructions from memory 140 directly or through a local cache (not shown) and provides the fetched instructions to issue unit 220. Issue unit 220 decodes the instructions and issues them to the execution resources in the back end of pipeline 120.

Throughout this discussion, the term "instruction" is used generally to refer to instructions, macro-instructions, instruction bundles or any of a number of other mechanisms used to encode processor operations. For example, the decode operation may transform a macro-instruction into one or more micro-operations ($\mu$pops), resolve an instruction bundle into one or more instruction syllables, or retrieve a micro-code sequence associated with an instruction.

The back end of pipeline 120 includes register unit 230, execution unit 250, exception unit 260 and retirement unit 270. Register unit 230 includes a register rename unit and various register files (not shown) to identify the registers specified in the instructions and to accesses the data from the identified registers, respectively. Execution unit 250 includes one or more branch execution units (BRU) 252, integer execution units (IEU) 254, load/store units (LSU) 256, and floating point execution units (FPU) 258 to process branch, integer, load/store, and floating point instructions. Exception unit 260 checks the results generated by execution units 250 and adjusts the control flow if an exceptional condition is encountered. If no exceptional conditions are detected, retirement unit 270 updates the architectural state of processor 110 with the results.

The units activated by different instructions correspond to various combinations and subsets of the execution resources indicated for pipeline 120. For example, one unit may include a floating-point register (in register unit 230), and FPU 258 may have components in two or more units. In general, a unit includes various execution resources (register files, execution units, tracking logic) that are activated and deactivated together. The present invention does not depend on the detailed mapping between the units and the execution resources shown in FIG. 2.

Figure 3:
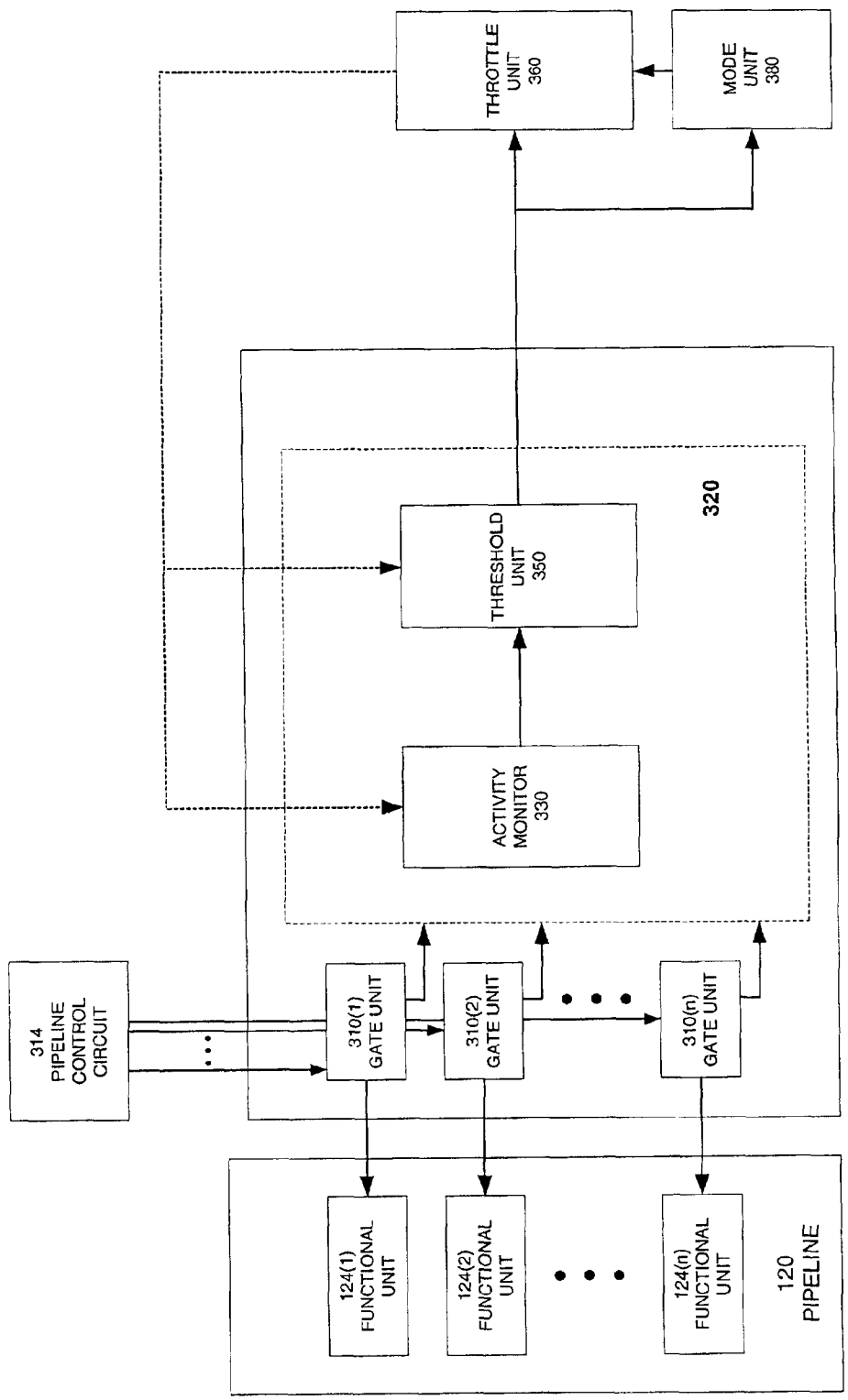
FIG. 3 is a block diagram of one embodiment of a digital power throttle implemented by the processor of FIG. 2.

FIG. 3 is a block diagram representing one embodiment of digital throttle 130 and its interactions with units 124 of pipeline 120. The disclosed embodiment of digital throttle 130 includes gate units 310(l)–310(n) (generically, gate unit 310), a monitor circuit 320, a throttle unit 360 and a mode unit 380. Each gate unit 310 is associated with a unit 124 in pipeline 120 and is capable of indicating an activity state of its associated unit. For example, gate unit 310 may be a clock sating circuit that couples or decouples a clock signal to unit 124 according to whether or not the services of unit 124 are necessary to implement an instruction currently in the pipe stage in which the unit operates.

For the disclosed embodiment of digital throttle 130, each gate unit 310 provides a signal to monitor circuit 320 to indicate an activity state of it associated unit. If the signal is asserted, monitor circuit 320 adds a first weight to an estimate representing the per clock activity of processor 110. The first weight represents the current or power drawn by unit 124 when it is activated. If the signal is not asserted, monitor circuit 320 adds a second weight to the estimate. The second weight represents the current or power drawn by unit 124 when it is deactivated. The second weight may be zero or a value representing a leakage current in deactivated unit 124. A typical processor may include 10–20 gate units 310 to control power delivery to 10–20 units 124.

Monitor circuit 320 collects signals from gate units 310, assesses a current power state from the collected signals, and determines whether to invoke one of the power control mechanisms, based on the assessed power state. If power control is warranted, monitor circuit 320 signals throttle unit 360 to implement one of the power control mechanisms. Mode unit 380 monitors the effects of the implemented power control mechanism and determines whether to invoke a different power control mechanism. Mode unit 380 may receive an indication of the efficacy of the current power control mechanism through monitor circuit 320, throttle unit 360 or some other source.

For the disclosed embodiment of digital throttle 130, monitor circuit 320 includes an activity monitor (AM) 330 and a threshold unit (TU) 350. AM 330 tracks the processor's activity, based on the activity states of monitored units 124, and provides an indication of the activity to TU 350 for comparison with a threshold value. TU 350 determines if the indicated activity has reached the threshold value and signals throttle unit 360 to trigger a power control mode if the threshold is reached.

For one embodiment of digital throttle 130, the threshold value indicates a high power consumption state, and throttle unit 360 triggers the processor to initiate a first power control mode. The first power control mode may, for example, provide linear control of power reduction by reducing instruction throughput or reducing the operating frequency of the processor. Mode unit 380, monitors the effect of the first power control mode and, if warranted, activates a second power mode.

Figure 4A:
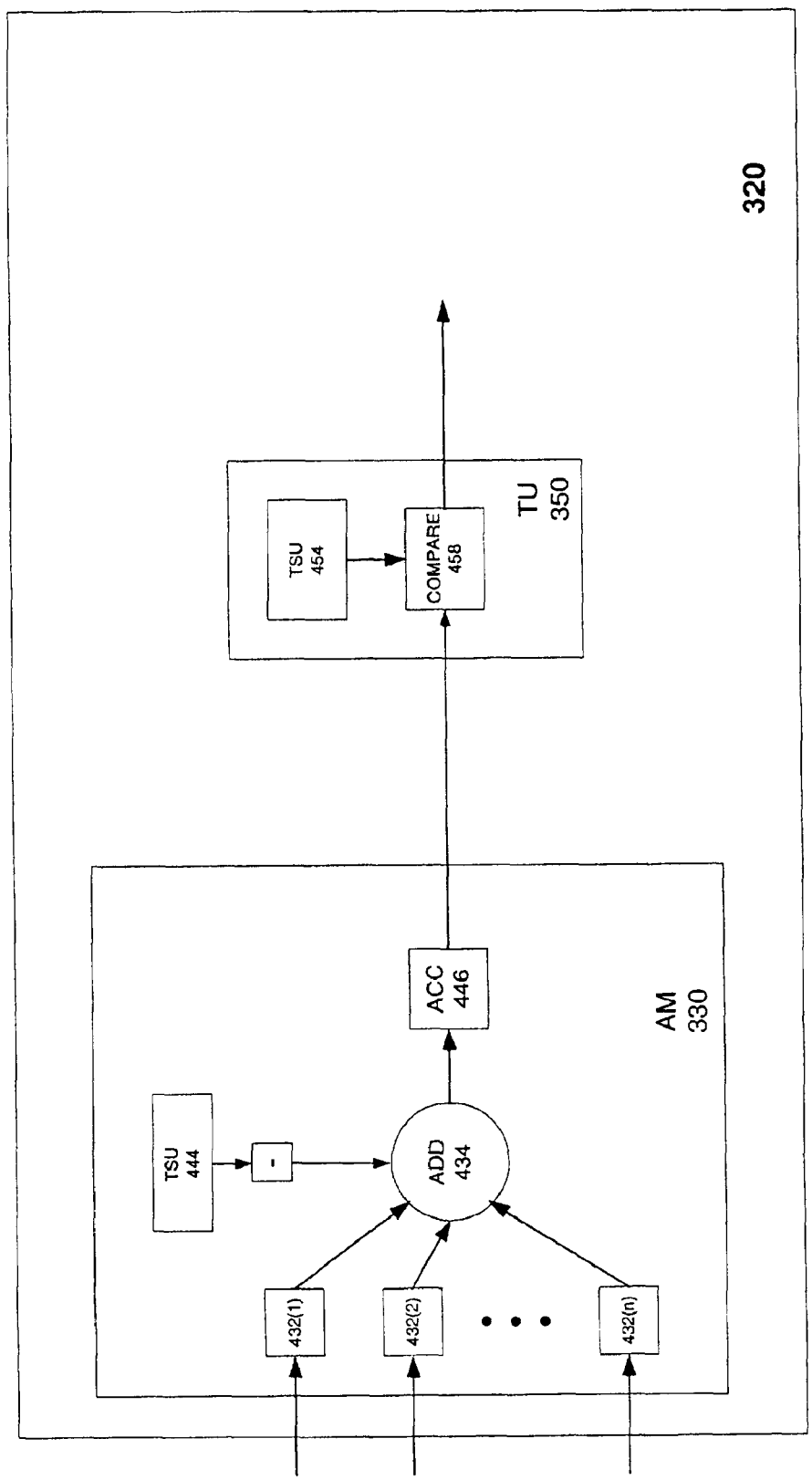
FIG. 4A is a block diagram of one embodiment of the monitor circuit of the digital power throttle of FIG. 3.

FIG. 4A is a block diagram of one embodiment of monitor circuit 320. The disclosed embodiment of AM 330 includes weight units 432(l)–432(n) (generically, weight units 432), an adder 434, a storage unit (SU) 444, and an accumulator 446. Each weight unit 432 is associated with one of units 124 through a corresponding gate unit 310. Weight unit 432 provides a first weight to adder 434 if the activity state signal from its gate unit 310 is asserted, and a second weight if the activity state signal is not asserted. A value in SU 444 may represent, for example, a nominal power or current level. The threshold value is negated and provided to another input of adder 434.

Adder 434 determines a difference between the threshold value and the sum of the weights indicated by weight units 134. This difference represents an activity level, relative to the, e.g., nominal power level (relative activity level or RAL). It is added to a value in accumulator 446, which maintains a running tally of the relative activity level. For one embodiment of AM 330, the relative activity level is provided on each clock cycle to accumulator 446, which effectively integrates the per cycle activity relative to the threshold value. For example, the weights may be scaled to represent an estimate of the per cycle power consumption of units 124, and the first threshold value may be a specified average power. In this case, the value in accumulator 446 represents thermal excess or deficit, relative to a temperature associated with the average power state.

Other embodiments of AM 330 may include circuitry to forward the value in accumulator 446 to threshold unit 350 at a specified sampling frequency. The sampling period allows digital throttle 130 to moderate the impact of power consumption spikes.

For the disclosed embodiment of monitor circuit 320, the value tracked by accumulator 446 (e.g. accumulated power or current consumption) is provided to TU 350 for comparison with a threshold value. The disclosed embodiment of TU 350 includes a storage 454 and a comparator 458. As noted above, the value in accumulator 446 may be provided on each clock cycle or following a specified sampling period. Storage 454 stores a value representing a threshold level against which the value in accumulator 446 is compared. For the example described above, the threshold may represent upper and lower temperature thresholds that trigger power reducing and power increasing mechanisms, respectively, if reached.

If the accumulated current consumption reaches the threshold represented by storage 454, TU 350 provides a signal to throttle unit 360, which triggers a power-control mechanism. As noted above, this may be accomplished by issuing fewer (more) instructions per clock cycle, reducing (increasing) the clock frequency at which the processor operates, reducing (increasing) the voltage at which it operates, or some combination of these strategies or other power reduction (increasing) strategies.

The power consumed by the processor's units depends on the operating point of the processor. For example, at lower frequencies and/or voltages, a given unit consumes less power in its activated state. Accordingly, one embodiment of AM 330 includes a scaling unit to adjust its activity estimation to reflect changes in the operating state. For other embodiments of digital throttle 130, AM 330 may also include a scaling unit to adjust its computations to reflect changes in the processors operating state. If a power control modes adjust the operating point of processor 110 to address an out-of-range power state, the scaling units allow AM 330 to adjust its estimate of processor activity to reflect the new operating point.

Figure 4B:
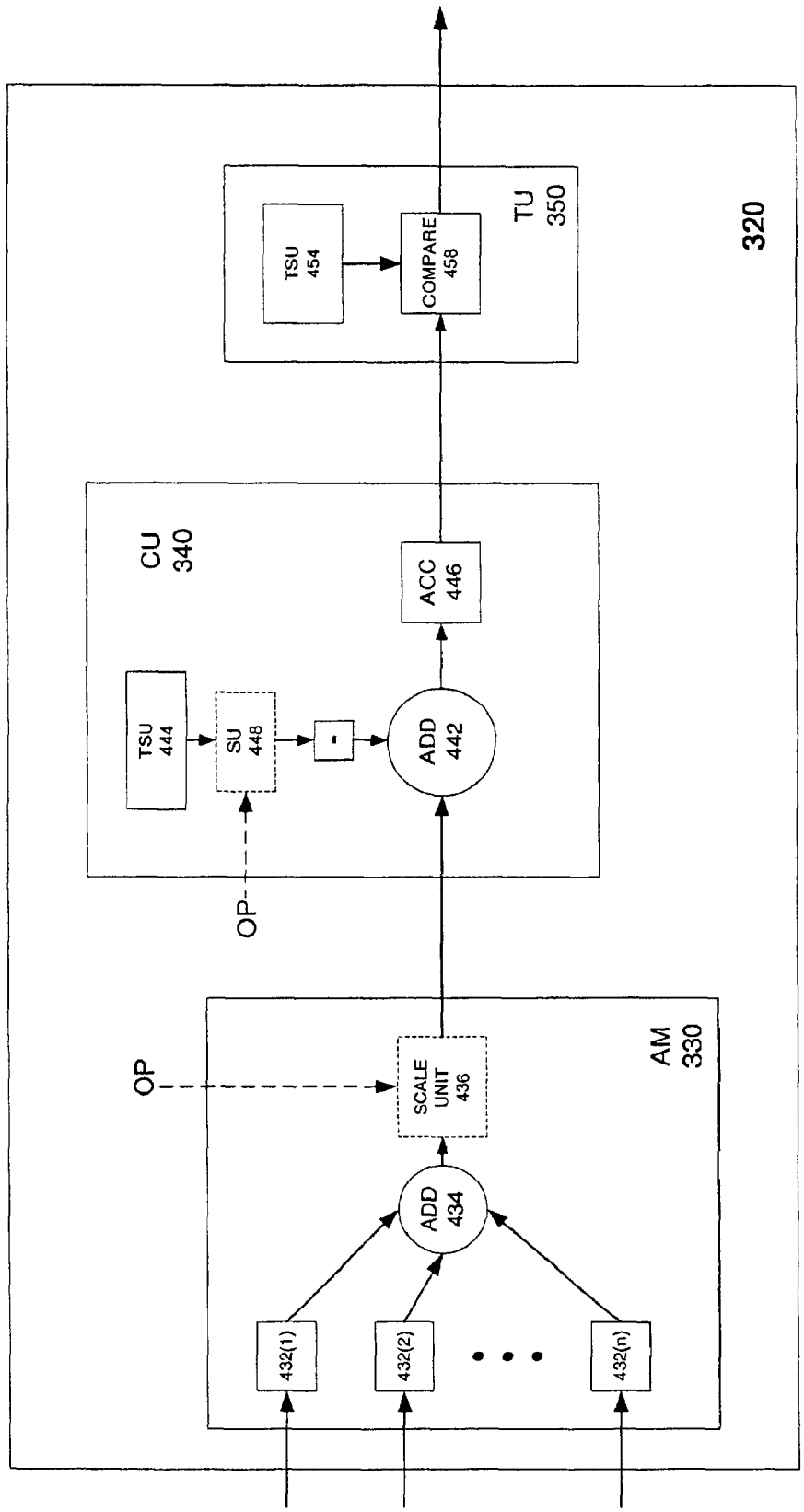
FIG. 4B is a block diagram of an alternative embodiment of the monitor circuit of FIG. 4A.

FIG. 4B shows another embodiment of monitor circuit 320 modified to account for changes in the operating point on the monitored activity of processor 110. The disclosed embodiment of AM 330 includes a first scale unit 436 at the output of adder 434. A conversion unit (CU) 340 includes a second adder 442, SU 444, and an optional second scale unit 448 at the output of SU 444.

Adder 434 sums the weights indicated by weight units 134 and scale unit 436 adjusts the sum to reflect the current operating point of the processor. A signal OP1 indicates the current operating point to scale unit 426. For example, scale unit 436 may store scale factors appropriate for different operating points and apply the scale factor appropriate for the current operating point, responsive to OP1.

The scaled activity level is then combined with the level from SU 444 through adder 442. Scaling unit (SU) 448, if present, allows a similar scaling to be applied to the value in storage unit 444, responsive to a change in the processor's operating point, indicated by OP2. As noted above, power control may be accomplished by issuing fewer (more) instructions per clock cycle, reducing (increasing) the clock frequency at which the processor operates, reducing (increasing) the voltage at which it operates, or some combination of these strategies or other power reduction (increasing) strategies. To the extent any of these changes effect the weighting appropriate for monitored units 124 or threshold value in TSU 444, new scale factor(s) may be selected for use by digital throttle 130.

Figure 5:
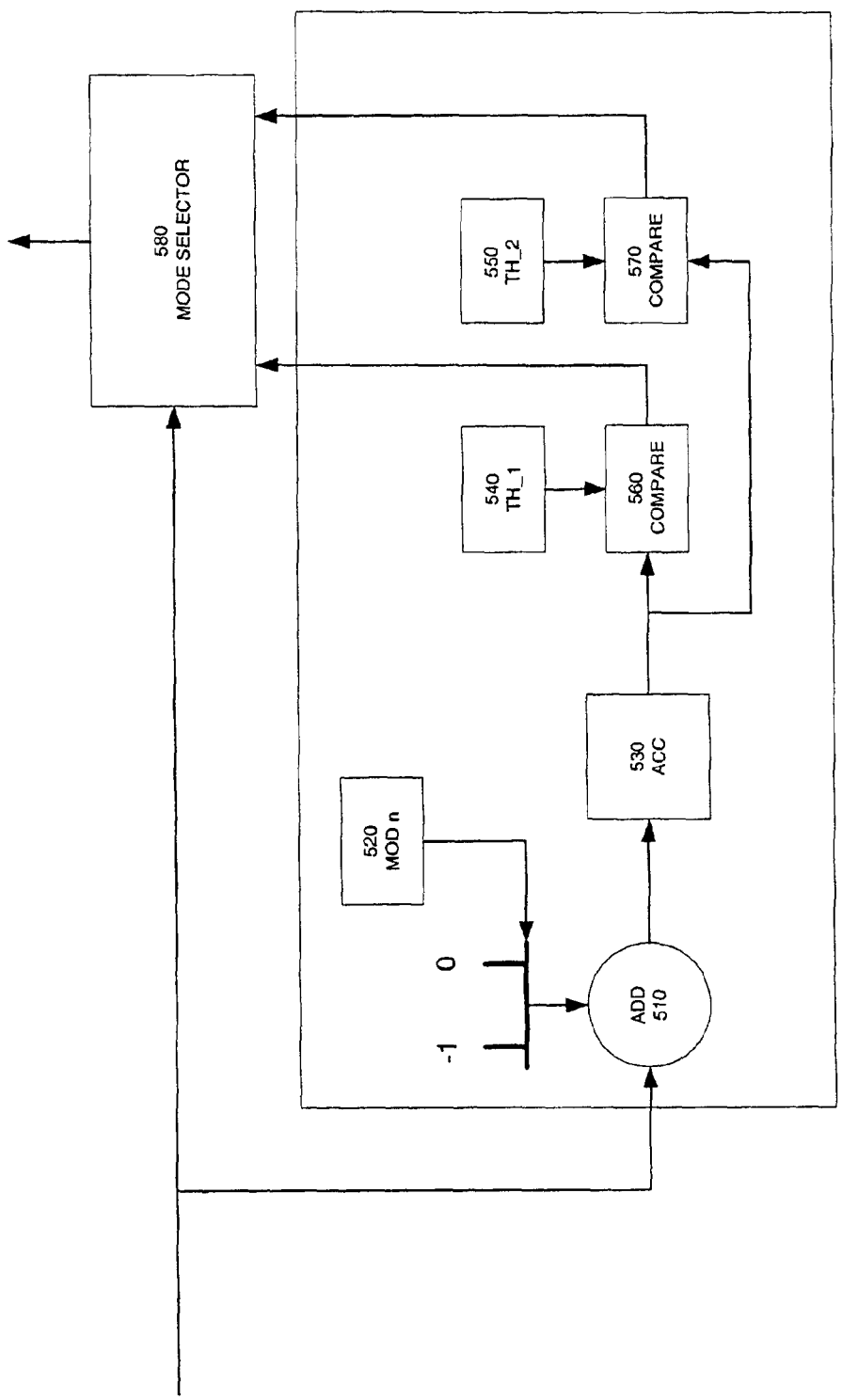
FIG. 5 is block diagram of one embodiment of the mode unit of the digital throttle shown in FIG. 3.

FIG. 5 is a block diagram of one embodiment of mode unit 380, suitable for switching among different power control mechanisms. The disclosed embodiment of mode unit 380 includes a saturation unit 510 and a mode selector 550. Saturation unit (SU) 510 monitors the efficacy of a power control mode that is currently operative, and mode selector 550 selects which, if any, power control mode is operative, based on inputs from TU 350 and SU 510.

The disclosed embodiment of SU 510 includes an adder 514, a reset unit 518, an accumulator 530, comparators 560, 570 and threshold stores 534(a), 534(b). Adder 514 and reset unit 518 monitor the output of TU 350 to determine whether or not the first power control mode is engaged. Accumulator 530 increments or decrements a stored value, according to whether or not the first power control mode is engaged. The stored value indicates how often the first power control mechanism is being engaged. If this value reaches a first threshold, e.g. the value in store 534(a), the first control mode is being activated too frequently, and a second control mode is warranted. If this value reaches a second threshold, e.g. the value in store 534(b), the second control mode is no longer necessary. First and second comparators 560 and 570 assert their signals to mode selector 550, which adjusts the control modes accordingly.

For one embodiment of the digital throttle the first control mode adjusts instruction throughput (ITP) and the second control mode adjusts the processor's operating point (OP). One mechanism for adjusting instruction throughput is to inject no-operations (NOPs) into the execution pipeline of the processor. U.S. patent application Ser. No. 10/041,092 describes on mechanism for injecting NOPs.

For a multi-mode digital throttle that employs instruction throughput rates and operating points to control power consumption, mode selector 550 may implement the actions summarized in Table 1. Here, AL refers to the (scaled) activity level tracked by AM 330 and TC refers to the throttle count tracked by mode unit 380.

TABLE 1

| Power Threshold | Upper Saturation Threshold | Lower Saturation Threshold | Current Mode Status | Action |
| --- | --- | --- | --- | --- |
| AL ≦ PT | TC ≦ UST | TC ≦ LST | Nominal OP Nominal ITP | None |
| AL ≦ PT | TC ≦ UST | TC ≦ LST | Nominal OP Nominal ITP | Reduce ITP (activate $1^{st}$ mode) |
| AL ≦ PT | TC ≦ UST | TC ≦ LST | Nominal OP Reduced ITP | Raise ITP (deactivate $1^{st}$ mode) |
| X | TC ≦ UST | TC ≦ LST | Nominal OP | Reduce OP (activate $2^{nd}$ mode) |
| X | TC ≦ UST | TC ≦ LST | Reduced OP | Raise OP (deactivate $2^{nd}$ mode) |

Figure 6:
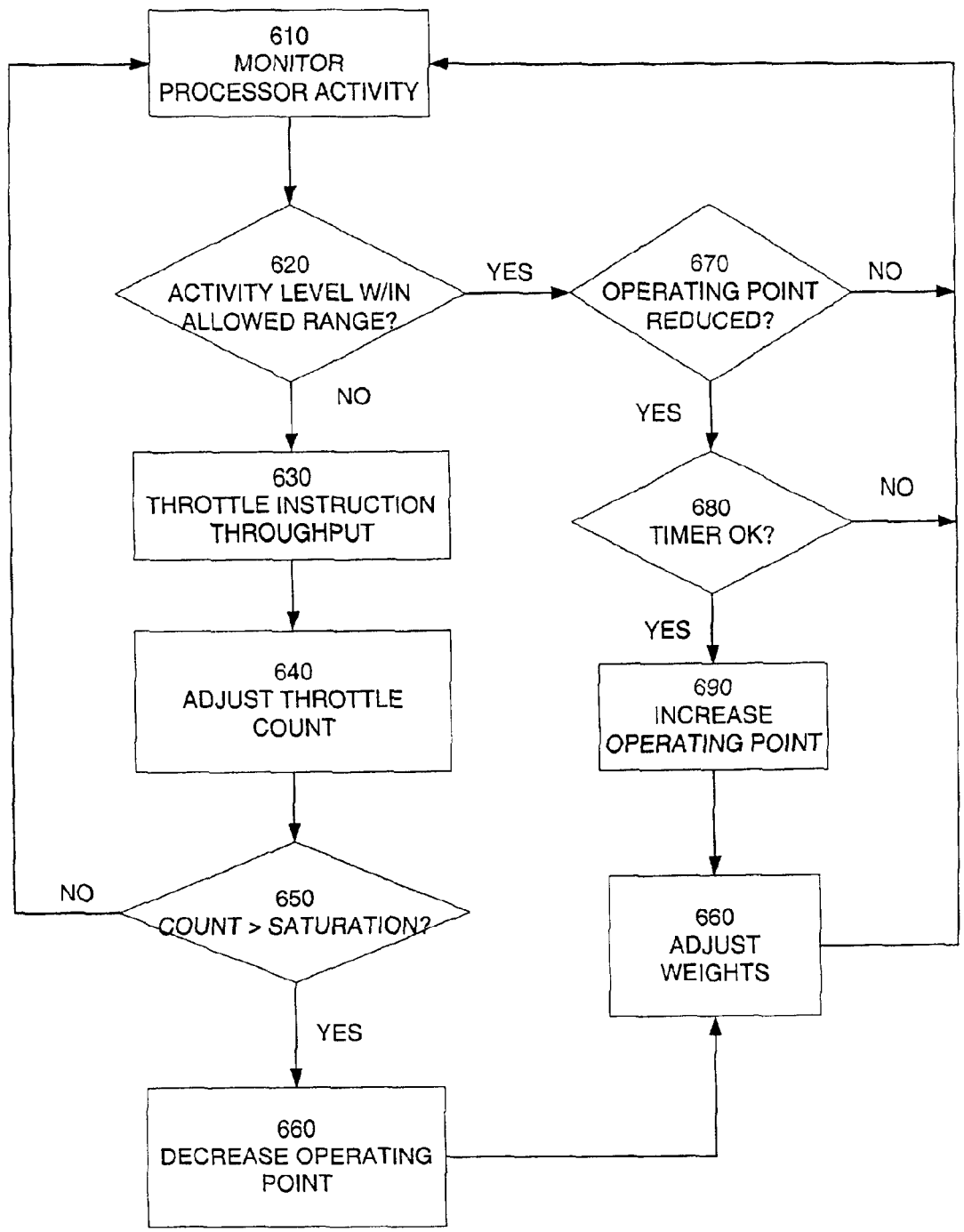
FIG. 6 is a flowchart representing one embodiment of a method for engaging different power control mechanisms in accordance with the present invention.

FIG. 6 is a flowchart representing one embodiment of a method 600 in accordance with the present invention for controlling power consumption in a processor. Method 600 monitors 610 the activity of the processor, based on active/inactive states of its component units. The estimated activity may be scaled according to the current operating point of the processor to provide an indication of the processor's power state. The activity level is compared 620 against an allowed range of activity levels. If the comparison 620 indicates the processor is operating outside the range, instruction throughput is throttled 630 and a throttle count is adjusted 640.

The throttle count is checked 650 to determine whether instruction throttling is being effective. For example, if instruction throttling is invoked repeatedly and the activity level remains outside the specified range, it is not effectively controlling the processor's power state, and the operating point of the processor is reduced 660. If weight scaling is supported, the weights used to scale the monitored activity level are also adjusted 670 and monitoring 610 continues.

If the processor activity level is within the specified range 620, the operating point of the processor is checked 670. If the operating point had been decreased previously, a timer is checked 680. The timer enforces a base interval between operating point switches to avoid switching the operating point too frequently. If the interval has passed 680, the operating point is increased 690 and weights used to determine the activity level are adjusted 670 and monitoring continues. If the interval has not passed 680, no operating point adjustment is made on this pass.

Method 600 has been illustrated for the case in which the first control mechanism is instruction throttling and the second control mechanism adjusts the processor's operating point, e.g. its voltage and/or frequency. Persons skilled in the art of processor design, having the benefit of this disclosure will recognize that other power control mechanisms may be employed. Further, the different mechanisms may each have different levels of operation. For example, the processor's operating point may be adjustable to a number of different frequency/voltage combinations, depending on the processor's power state. Similarly, instructions may be throttled for longer or shorter periods, depending on how long the relative activity level stays above the threshold. For example, a no-operation (NOP) may be introduced into the instruction stream for every $n^{th}$ actual instruction, with n taking on a range of values.

Figure 7:
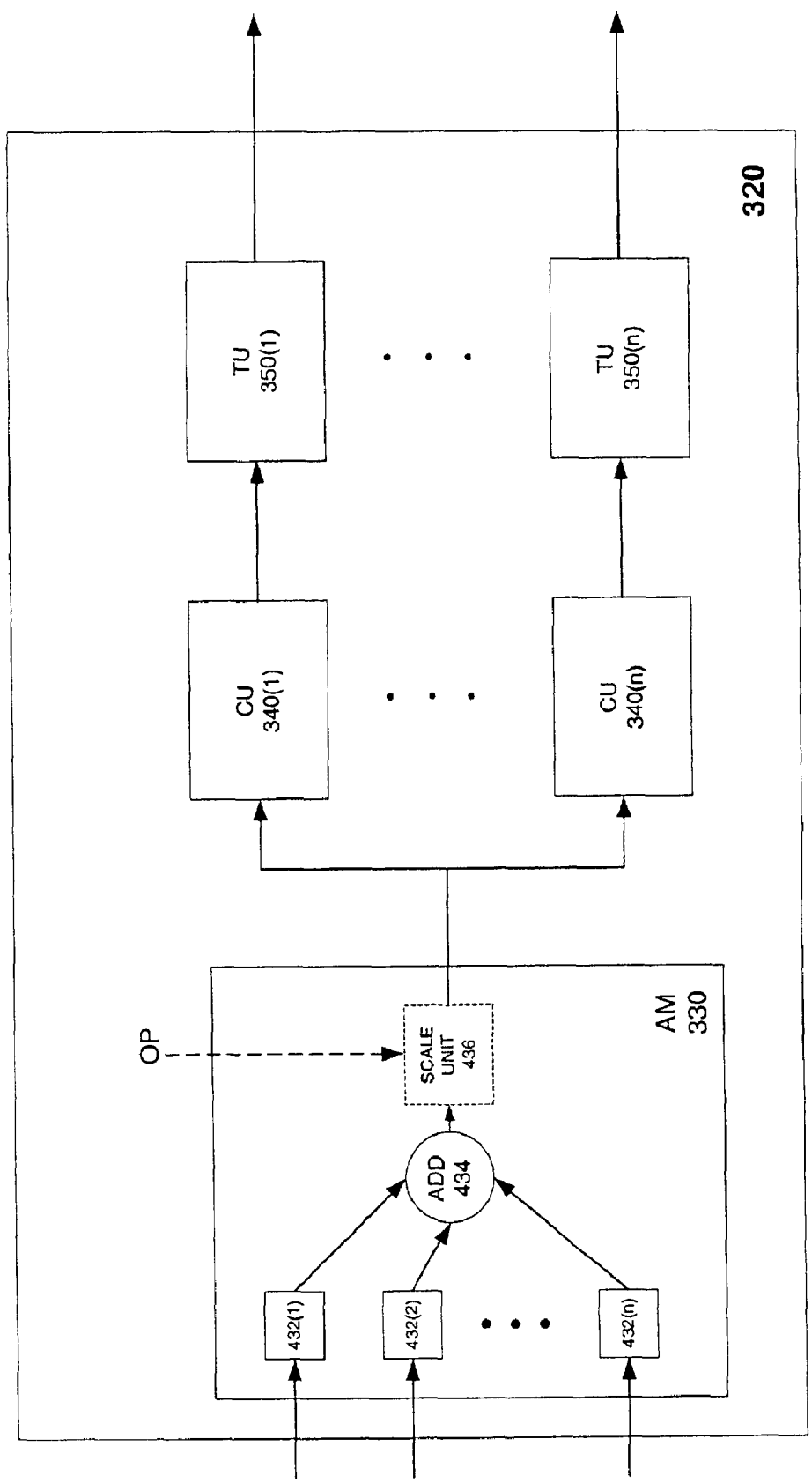
FIG. 7 is a block diagram of another embodiment of a monitor circuit for the digital throttle shown in FIG. 3.

FIG. 7 is a block diagram of another embodiment of digital throttle 130. The disclosed embodiment of digital throttle incorporates multiple CUs 340(*l*) . . . 340(*n*) (generically, CU 340) and associated TUs 350(*l*) . . . 350(*n*) (generically, TU 350). Each CU/TU pair may be used to monitor the processor power state for different power/timing regimes. For example, a second CU/TU pair 340(*l*)/350(*l*) may compare a different relative activity level (RAL) to a threshold indicating that frequency (or voltage/frequency)-based power control mechanism is warranted (OP1 threshold).

A mode control unit 380 is also shown to monitor the power control mechanisms and switch between power control modes based on the behavior, e.g. saturation, of the active power control mode(s). For example, if ITP power control mode is engaged repeatedly (saturates), mode control unit 380 may engage a frequency-based power control mode. With frequency control mode engaged, mode control unit 380 may engage a voltage or voltage/frequency-based control mode in response to continued, repeated engagement of ITP.

Figure 8:
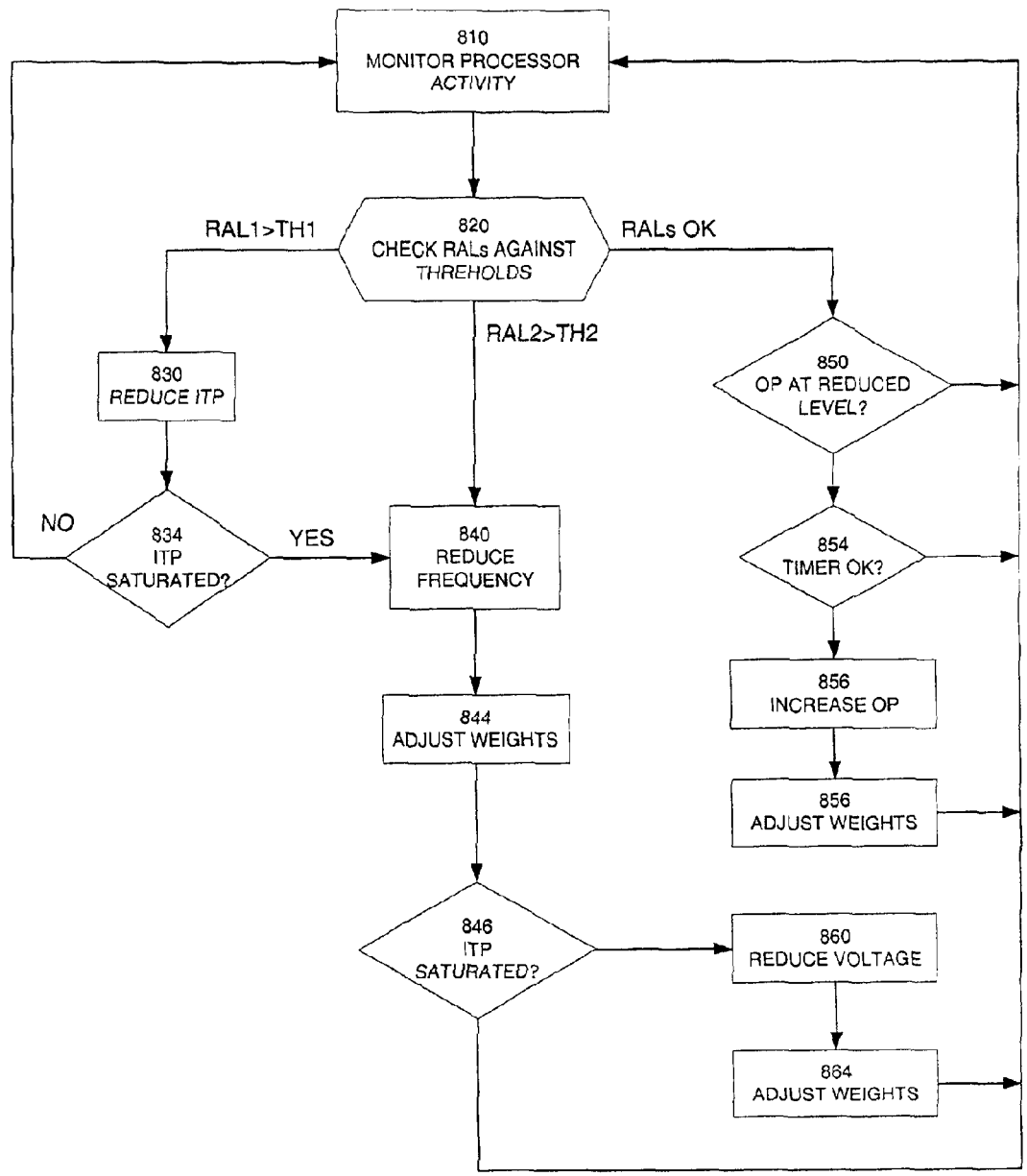
FIG. 8 is a flowchart representing another embodiment of a method for engaging different power control mechanisms in accordance with the present invention.

FIG. 8 is a flow chart representing yet another embodiment of a method 800 for activating different power control mechanisms. Method 800 tests relative activity levels (RAL1, RAL2) 820 against their respective thresholds, and engages, e.g. ITP or frequency-based power control mechanisms as indicated. ITP is checked 834, 846 in both modes for signs of saturation. In ITP mode, frequency adjustment may be engaged if saturation is detected 834. If frequency mode is engaged, voltage or voltage/frequency mode may be engaged if saturation is detected. Adjustments to the processor's operating point (frequency and/or voltage) may be accompanied by corresponding adjustments to the weights employed to monitor the processor's activity levels. If no RAL threshold is crossed 820, method 800 may increase 856 the operating point of the processor if it had been previously reduced via 840, 860.

The resulting combination of power control modes and levels within different power control modes allows the processor's power state to be fine-tuned in a manner that reduces the impact of power throttling on processor performance.

There has thus been provided a digital throttle that monitors the activity of a processor and selects one of two or more power control mechanisms as required to address power state problems. The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

We claim:

1. A system comprising:
    a memory;
    a logic system coupled to the memory; and
    a processor coupled to the memory wherein the processor comprises;
        an execution pipeline; and
        a digital throttle coupled to the execution pipeline, wherein the digital throttle is to estimate a power state, responsive to activity of the execution pipeline, and to trigger one of a plurality of power-control mechanisms, responsive to the estimated power state reaching a first threshold.

2. The system of claim 1, wherein the power control mechanism include adjusting instruction throughput of the execution pipeline and adjusting an operating point for the execution pipeline.

3. The system of claim 1, wherein the digital throttle comprise an activity monitor to provide an activity level responsive to activity states of units of the execution pipeline, a conversion unit to estimate the power state from the activity level, and a threshold unit to trigger a first power control mechanism, responsive to the power state reaching the first threshold.

4. The system of claim 3, wherein the digital throttle triggers a second power control mechanism responsive to an indication that the second power control mechanism is warranted.

5. The system of claim 3, wherein the digital throttle includes a mode unit to monitor an output of the threshold unit and to trigger the second power control mechanism, responsive to the output reaching a second threshold.

6. The system of claim 5, wherein the first power control mechanism adjusts instruction throughput for the execution pipeline and the second power control mechanism adjusts an operating point to the execution pipeline.

7. The system of claim 1, further comprising a mode unit to switch from a first power control mode to second power control mode, responsive to the first power control mode reaching a saturation condition.

8. A method comprising:
    monitoring an activity level of a processor to determine a power state;
    activating a first power control mechanism if the power state meets a first threshold;
    monitoring a status associated with the first power control mechanism; and
    activating a second power control mechanism responsive to the monitored status.

9. The method of claim 8, wherein the status is a counter that indicates a level of power control provided by the first power control mechanism and activating the second power control mechanism comprises activating the second power control mechanism, responsive to the counter reaching a threshold value.

10. The method of claim 9, wherein the counter tracks a number of times the first power control mechanism is activated or a duration for which the first power control mechanism is activated.

11. The method of claim 8, wherein activating the first power control mechanism comprises adjusting instruction throughput for the processor, responsive to the power state reaching the first threshold.

12. The method of claim 11, wherein activating the second power control mechanism comprises adjusting an operating point of the processor, responsive to the monitored status.

13. An apparatus comprising:
   an execution pipeline including one or mare units to execute instructions;
   an activity monitor to estimate an activity level for the processor, responsive to a activity states of the one or more units;
   a throttle circuit to trigger a first power mode, responsive to a power state determined from the estimated activity level reaching a first threshold; and
   a mode unit to track a status associated with the first power mode and to trigger a second power mode, responsive to the status reaching a second threshold.

14. The apparatus of claim 13, wherein the status is a counter value that tracks usage of the first power mode and the mode circuit triggers the second power mode if the usage reaches the second threshold.

15. The apparatus of claim 14, wherein the vomiter tracks a number of times the first power mode is triggered or an interval for which the first power mode is active.

16. The apparatus of claim 13, wherein the first power mode adjusts instruction throughput for the execution pipeline and the second power mode adjusts an operating point for the execution pipeline.

17. The apparatus of claim 16, wherein the second power mode specifies one of multiple combinations of voltage and frequency values at which the execution pipeline may be operated.

18. The apparatus of claim 17, wherein the mode unit initiates the second power mode at a first of the combinations, and selects a new combination, responsive to an estimated power state for the execution pipeline operating under the first combination.

19. The apparatus of claim 17, wherein the mode unit deactivates the second power mode responsive to the power state for the execution pipeline operating under a current combination reaching a fourth threshold.

* * * * *

UNITED STATES PATENT AND TRADEMARK OFFICE
CERTIFICATE OF CORRECTION

PATENT NO. : 6,931,559 B2
DATED : August 16, 2005
INVENTOR(S) : Burns et al.

It is certified that error appears in the above-identified patent and that said Letters Patent is hereby corrected as shown below:

Column 4,
Line 55, delete "μpops" and insert -- μops --.

Column 5,
Line 26, delete "sating" and insert -- gating --.

Column 11,
Line 15, delete "mare" and insert -- more --.

Signed and Sealed this

Fifteenth Day of November, 2005

JON W. DUDAS
*Director of the United States Patent and Trademark Office*